United States Patent
Valencia

(10) Patent No.: US 11,687,912 B2
(45) Date of Patent: Jun. 27, 2023

(54) METHOD OF AND SYSTEM FOR ENABLING A PAYMENT TRANSACTION TO BE CONDUCTED IN A LINKED, INTEGRATED, INTERCHANGEABLE PAYMENT SYSTEM (LIIPS) INCLUDING A PASSAGEWAY PAYMENT SYSTEM USING AN RFID STICKER LINKED TO PAYMENT DEVICES

(71) Applicant: Renato Valencia, Muntinlupa (PH)

(72) Inventor: Renato Valencia, Muntinlupa (PH)

( * ) Notice: Subject to any disclaimer, the term of this patent is extended or adjusted under 35 U.S.C. 154(b) by 0 days.

(21) Appl. No.: 16/072,187

(22) PCT Filed: May 15, 2017

(86) PCT No.: PCT/IB2017/052837
§ 371 (c)(1),
(2) Date: Jul. 24, 2018

(87) PCT Pub. No.: WO2018/211308
PCT Pub. Date: Nov. 22, 2018

(65) Prior Publication Data
US 2021/0174334 A1 Jun. 10, 2021

(51) Int. Cl.
*G07B 15/02* (2011.01)
*G06Q 20/32* (2012.01)
(Continued)

(52) U.S. Cl.
CPC ..... *G06Q 20/3278* (2013.01); *G06K 19/0776* (2013.01); *G06Q 20/204* (2013.01);
(Continued)

(58) Field of Classification Search
CPC ...... G07B 15/063; G07B 15/00; G06Q 50/30; G06Q 20/102; G06Q 30/04;
(Continued)

(56) References Cited

U.S. PATENT DOCUMENTS 8,660,890 B2 * 2/2014 Hedley ................. G08G 1/017
705/13
9,633,243 B1 * 4/2017 Geist .................. G06Q 20/3278
(Continued)

FOREIGN PATENT DOCUMENTS

EP 1870849 A2 12/2007
JP 2002-228460 A 8/2002
(Continued)

*Primary Examiner* — Jamara A Franklin
(74) *Attorney, Agent, or Firm* — Peter R. Kramer; Ingenium Patents LLC

(57) ABSTRACT

The present invention relates generally to enabling payment transactions to be conducted and particularly to a method of, a system for, and a server computer for enabling a payment transaction to be conducted in a linked, integrated, interchangeable payment system (LIIPS) including a passageway payment system using a radio frequency identification (RFID) sticker, or any device similar to it, which is linked to payment devices such as credit cards, debit cards, prepaid cards, or payment-enabled mobile phones, and further referenced to one or more payment accounts such as credit accounts, debit accounts, and prepaid accounts associated with the payment devices for easy payment of toll fees and other charges in passageways such as tollways or similar facilities such as, for example, for ferries, roll-on/roll-off (RORO) ships, parking areas, parks, events areas, events centers, and the like. Further, the payment device can be engaged in a point-of-sale (POS) transaction at any POS system which may include an RFID interrogator for interrogating the RFID sticker as and when a vehicle to which the RFID sticker is secured moves into the periphery of the RFID interrogator located, for example, in a tollway.

35 Claims, 9 Drawing Sheets

(51) Int. Cl.
*G06K 19/077* (2006.01)
*G06Q 20/20* (2012.01)
*G06Q 20/22* (2012.01)
*G06Q 20/40* (2012.01)
*G07B 15/06* (2011.01)

(52) U.S. Cl.
CPC ......... *G06Q 20/227* (2013.01); *G06Q 20/405* (2013.01); *G07B 15/063* (2013.01)

(58) Field of Classification Search
CPC ........... G06Q 2240/00; G06Q 20/3278; G06Q 20/105; G06Q 20/363; G06Q 20/32; G08G 1/017; G08G 1/0175; G06K 19/0723; G06K 7/10366; G06K 19/07749; G07F 7/1008; G07F 17/246; G07F 17/0021; G07F 7/0866
USPC .... 235/375, 379, 380, 384; 340/10.1, 572.1, 340/928, 933; 705/13
See application file for complete search history.

(56) References Cited

U.S. PATENT DOCUMENTS

| | | |
|---|---|---|
| 2011/0208568 A1 | 8/2011 | Deitiker et al. |
| 2013/0253997 A1 | 9/2013 | Robinson et al. |

FOREIGN PATENT DOCUMENTS

| | | |
|---|---|---|
| JP | 2013-8294 A | 1/2013 |
| WO | 98/025248 A1 | 6/1998 |

* cited by examiner

METHOD OF AND SYSTEM FOR ENABLING A PAYMENT TRANSACTION TO BE CONDUCTED IN A LINKED, INTEGRATED, INTERCHANGEABLE PAYMENT SYSTEM (LIIPS) INCLUDING A PASSAGEWAY PAYMENT SYSTEM USING AN RFID STICKER LINKED TO PAYMENT DEVICES

CROSS-REFERENCE TO RELATED APPLICATIONS

The present application claims priority to International Application No. PCT/IB2017/052837 filed on 15 May 2017, the entirety of which is incorporated herein by reference for all purposes.

FEDERALLY SPONSORED RESEARCH

NOT APPLICABLE

SEQUENCE LISTING OR PROGRAM

NOT APPLICABLE

TECHNICAL FIELD

The present invention relates generally to enabling payment transactions to be conducted and particularly to a method of, a system for, and a central processing server computer for enabling payment transactions to be conducted in a linked, integrated, interchangeable payment system (LIIPS) including a passageway payment system using, as a primary payment device, a radio frequency identification (RFID) sticker, or any device similar to it, which is linked to one or more enabled payment devices and referenced to one or more enabled payment accounts associated with the enabled payment devices.

BACKGROUND ART

Use of different passageway payment systems is, by and large, proprietary, expensive and generally independent of each other. Thus, most car owners or vehicle drivers need to register their vehicles in each passageway system such as tollway payment systems to be able to travel across various passageways which makes registration and payments tedious and complicated.

Many passageways still deploy DSRCs (Dedicated Short Range Communications) which require transponders or OBUs (On Board Units), and these are relatively expensive to install and operate. Some passageways such as tollways are shifting to payment systems using RFID stickers which are relatively less expensive to operate and maintain. Yet, despite the shift to relatively cheaper payment systems for tollways, one has to bear with disparate and independent payment systems which most car owners and vehicle drivers find rather vexing among other problem causing situations.

SUMMARY OF THE INVENTION

An aspect of the invention provides a computer-implemented method of enabling a payment transaction to be conducted in a linked, integrated, interchangeable payment system (LIIPS) including a passageway payment system using, as a primary payment device, a radio-frequency identification (RFID) sticker, or any device similar to it, which is secured to a vehicle such as a motorcycle or a car, wherein the RFID sticker has an antenna and an RFID circuitry coupled to the antenna.

The first step of the method comprises linking, by at least one first computer system maintained in at least one financial institution, the primary payment device like the RFID sticker to a plurality of payment devices by matching and storing in the memory system of the at least one first computer system an RFID sticker identifier associated with the RFID sticker and a payment device identifier associated with each payment device of the plurality of payment devices.

The second step of the method comprises referencing, by the at least one first computer system, the RFID sticker identifier to one or more electronic payment accounts held at the at least one first computer system and associated with each payment device.

The third step of the method comprises arranging, by the at least one first computer system, the payment accounts to be enabled for use in the payment transaction in a priority order if there are two or more of the payment accounts.

The fourth step of the method comprises causing, by the at least one first computer system, each payment account to be enabled or disabled for use in the payment transaction.

The fifth step of the method comprises interrogating, by an RFID interrogator connected to a second computer system maintained in the passageway payment system, the RFID circuitry through the antenna as and when the vehicle moves into the periphery of the RFID interrogator.

The sixth step of the method comprises acquiring, by the second computer system, the RFID sticker identifier through the interrogated RFID circuitry.

The seventh step of the method comprises extracting, by the second computer system, from the acquired RFID sticker identifier payment account information associated with one of the enabled payment accounts according to the priority order and associated with one of the enabled payment devices.

The payment transactions enabled to be conducted using the computer-implemented method of the invention with the provision of utilizing the RFID sticker as the primary payment device, or any device similar to it, linked to various payment devices and referenced to various payment accounts support an integrated, easy-to-use, cost-efficient, and multi-purpose passageway payment system even where the same payment system normally include a significant number of concerned parties such as issuers, merchants, acquirers, third party processors, international payment systems, and clearing and settlement banks.

For a better understanding of the invention and to show how the same may be performed, preferred embodiments thereof will now be described, by way of non-limiting examples only, with reference to the accompanying drawings.

DETAILED DESCRIPTION OF THE PREFERRED EMBODIMENTS

Figure 1:
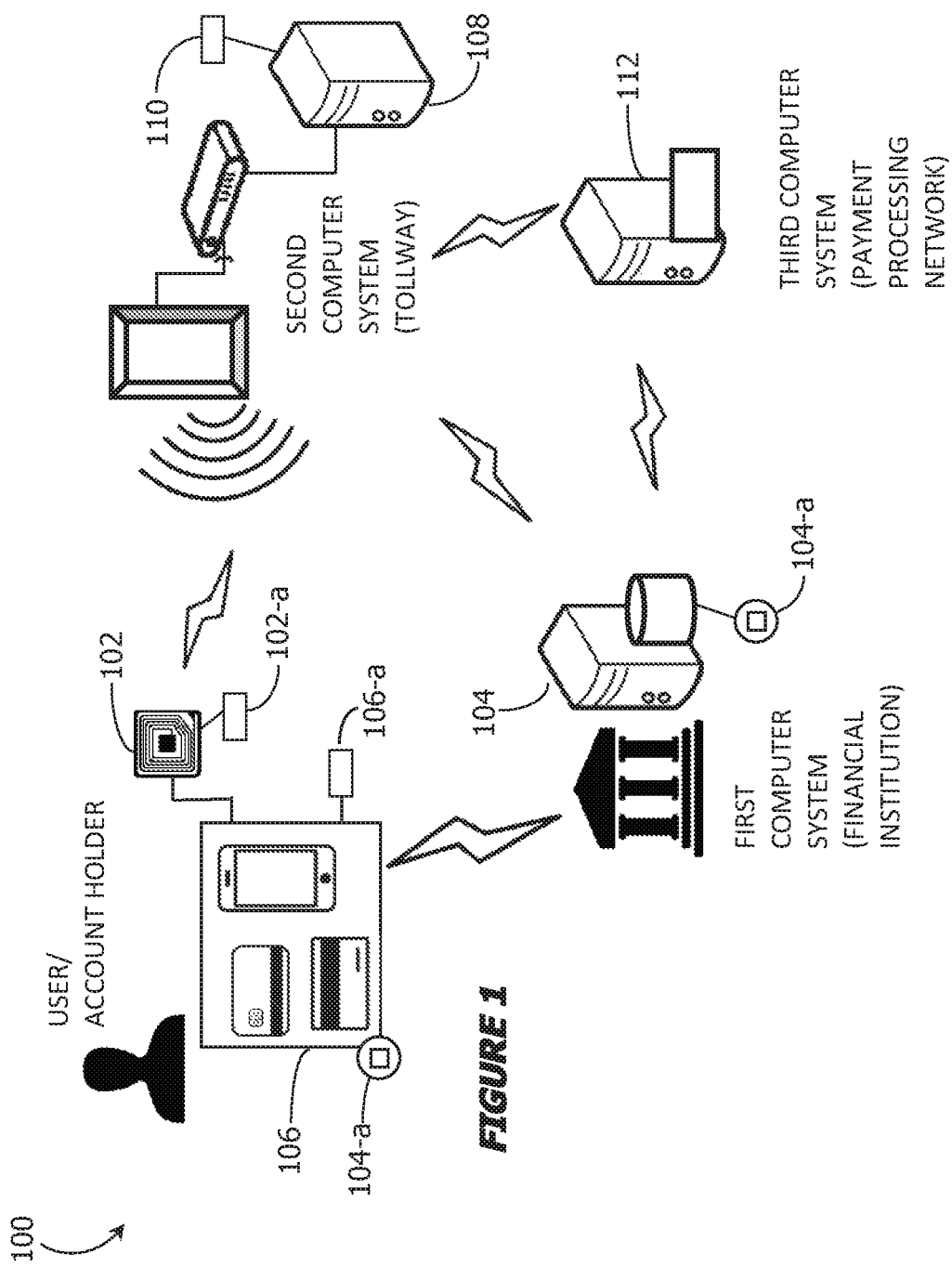
FIG. 1 is a block diagram illustrating a high level architecture of a computer-based system for enabling a payment transaction to be conducted in a linked, integrated, interchangeable payment system (LIIPS) including a passageway payment system using, as a primary payment device, a radio-frequency identification (RFID) sticker linked to one or more payment devices and referenced to one or more payment accounts.

One or more execution methods, execution systems, transaction platforms, programming systems, classes, and class objects according to one or more implementations of the present invention, including various computer-designed aspects, processes, sub-processes and configurations of the same, may be implemented on a variety of electronic computing devices and systems, including electronic data access devices and/or electronic server devices, wherein these computing devices include well known and appropriate processing mechanisms and computer-readable media for storing, fetching, executing, and interpreting computer-readable instructions, such as programming instructions, codes, signals, and/or the like.

Further, the present invention may include procedures for implementing logic control in programmable controllers in distributed control systems in either wired or wireless data networks. All the ensuing disclosures and illustrations of the preferred implementations of the present invention, along with one or more components, features or elements thereof, are merely representative for the purpose of sufficiently describing the manner by which the present invention may be carried out into practice in various ways other than the ones outlined in the ensuing description.

It is to be understood and appreciated by a person skilled in the art or having ordinary skills in the art, however, that the exemplary implementations used to describe how to make and use the present invention may be embodied in many alternative forms and should not be construed as limiting the scope of the appended claims in any manner, absent express recitation of those features in the appended claims. All the exemplary drawings, diagrams and illustrations accompanying the ensuing description should also not be construed as limiting the scope of the appended claims in any manner.

In the ensuing description, numerous specific details such as components, method-steps or process-steps, elements, features, and techniques, are set forth in order to provide a thorough understanding of the ensuing disclosures and how they may be practiced in particular embodiments. However, it will be appreciated by a person skilled or having ordinary skills in the art to which the present invention belongs that the present disclosures may be practiced without these specific details. In other instances, well known features, characteristics, methods, structures and techniques have not been shown in detail in order not to obscure an understanding of the ensuing disclosures.

References to "an embodiment," "one embodiment," "exemplary embodiment," "example embodiment," "various embodiments," and so forth indicate that the embodiment(s) of the present disclosure so described may include a particular feature, characteristic, method, structure, or technique, but not every embodiment necessarily includes the particular feature, characteristic, method, structure, or technique. Further, repeated use of these phrases relating to one or more embodiments and their associated one or more aspects of the present invention do not necessarily refer to the same embodiment, although they may.

It is also to be understood and appreciated that the use of ordinal terms like "first" and "second" is used herein to distinguish one element, feature, component, calculation or method-step from one another and should not also be construed as limiting the scope of the appended claims, and that these and such other ordinal terms that may appear in the ensuing description are not indicative of any particular order of elements, features, calculations, components or method-steps to which they are attached. For example, a first element could be termed a second element. Similarly, a second element could be termed a first element. All these do not depart from the scope of the herein disclosure and its accompanying claims.

Unless the context clearly and explicitly indicates otherwise, it is to be understood that like reference numerals refer to like elements throughout the ensuing description of the figures and/or drawings, that the linking term "and/or" includes any and all combinations of one or more of the associated listed items, that the singular terms "a", "an" and "the" are intended to also include the plural forms, and that some varying terms of the same meaning and objective may be interchangeably used throughout the ensuing disclosure.

Figure 2:
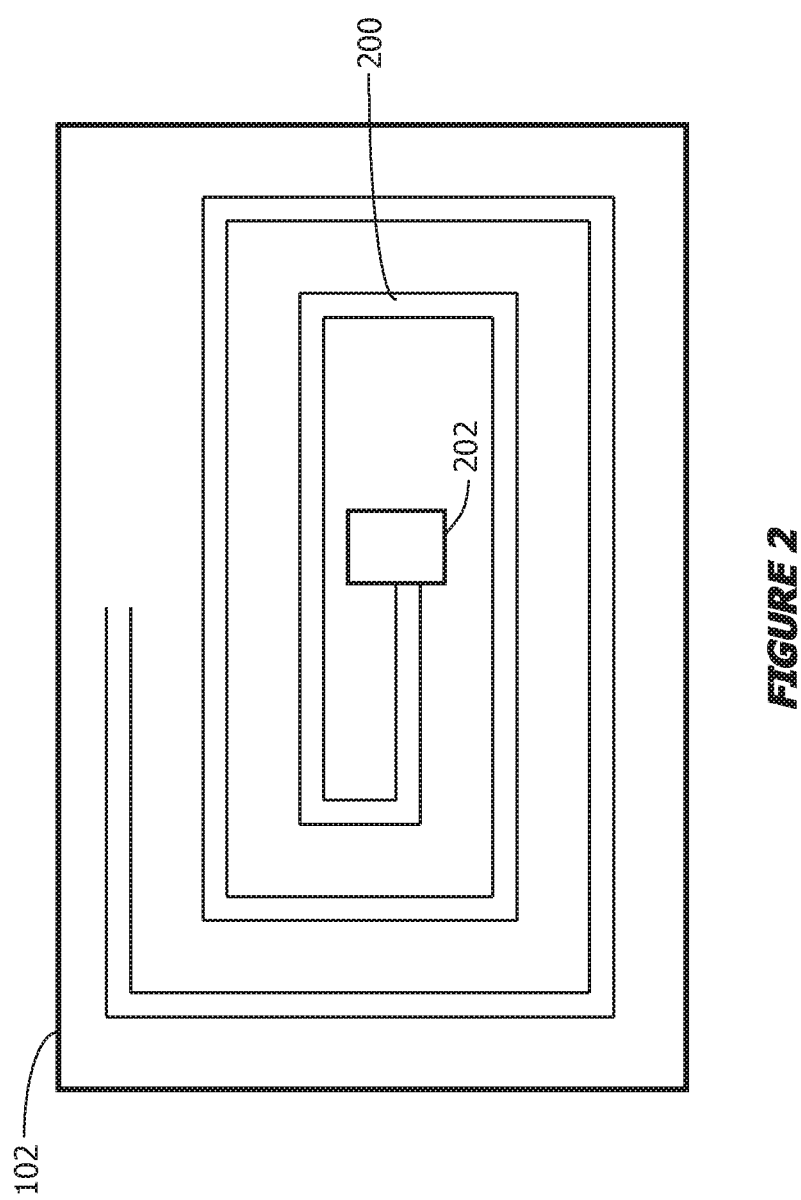
FIG. 2 is an example structure of the RFID sticker illustrated in the computer-based system of FIG. 1.

Referring now to FIG. 1, there is shown a block diagram which illustrates a high level architecture of a computer-based system, which is generally designated by reference numeral 100, for enabling a payment transaction to be conducted in a linked, integrated, interchangeable payment system (LIIPS) including a passageway payment system using, as a primary payment device, a radio-frequency identification (RFID) sticker 102, or any device similar to it, which is linked to one or more payment devices 106 and one or more payment accounts 104-*a* associated with the payment devices 106. As shown in FIG. 2, the structure of the RFID sticker 102 may have an antenna 200 and may include an RFID circuitry 202 coupled to the antenna 200.

The RFID sticker 102, or any device similar to it such as an RFID label or an RFID inlay, can be secured to a vehicle in a manner that it is detachably attached (e.g., by means of using a double-sided adhesive tape) to the vehicle which may be a car, a motorcycle, a roll-on/roll-off (RORO) ship, a boat, a ferry, an aircraft (e.g., plane, helicopter, and fighter jet), a truck, a bus, a multi-purpose passenger vehicle, or the like. The vehicle driver or vehicle owner may apply for or obtain the RFID sticker 102 linked to the herein disclosed linked, integrated, interchangeable payment system (LIIPS) consisting of payment devices 106 and payment accounts 104-*a* in a manual or otherwise electronic manner through a mobile phone or any similar device which is well known in the art.

An example of the RFID sticker 102 that can be adapted for use in one or more aspects of the present invention may refer to an RFID tag which is disclosed in United States Patent Publication No. 20150262053 published to Textilma AG on Sep. 17, 2015, in United States Patent Publication No. 20130265134 published to Alien Technology Corporation on Oct. 10, 2013, the full content of each of which is incorporated herein by reference in its entirety and for all purposes, or in any similar well known structure.

The system 100 comprises at least one first computer system 104 maintained in at least one financial institution and arranged to link or cause linking of the RFID sticker 102 to a plurality of payment devices 106 by matching and storing in the first computer system 104 an RFID sticker identifier 102-*a* associated with the RFID sticker 102. The linking of the RFID sticker 102 to the payment devices 106 may also involve matching and storing in the first computer system 104 a payment device identifier 106-*a* associated with each payment device 106 of the plurality of payment devices 106.

The first computer system 104 may also be arranged to reference or caused to reference the RFID sticker identifier 102-*a* to one or more payment accounts 104-*a* held at the first computer system 104 and associated with each payment device 106. Each or both of the RFID sticker identifier 102-*a* and the payment accounts 104-*a* may be in the form of alphanumeric characters forming a unique combination of letters, numbers and/or any similar digital representations which are well known in the art.

The first computer system 104 may also be arranged to cause each payment device 106 to be enabled or disabled for use in the payment transaction, and to arrange the payment accounts 104-*a* to be enabled for use in the payment transaction in a priority order if there are two or more of the payment accounts 104-*a*.

The system 100 further includes a second computer system 108 maintained in the herein disclosed linked, integrated, interchangeable payment system (LIIPS) which may include the likewise herein disclosed passageway payment system.

The second computer system 108 may have an RFID interrogator 110. As and when the vehicle passes through a passageway where at least one component of the passageway payment system is located and subsequently moves into the periphery of the RFID interrogator 110, the second computer system 108, through the RFID interrogator 110, is arranged to interrogate the RFID circuitry 202 through the antenna 200, wherein said periphery can be any predetermined reading distance or radius, depending on the specification and/or configuration of the RFID interrogator 110 and the RFID circuitry 202 associated with the RFID interrogator 110 located in the passageway such as a tollway.

The interrogation of the RFID circuitry 202 through the antenna 200, which is well known in the art of electronic communications, may cause the second computer system 108 to acquire the RFID sticker identifier 102-*a*. In turn, the second computer system 108 extracts from the acquired RFID sticker identifier 102-*a* payment account information associated with one of the enabled payment accounts 104-*a* according to the priority order and associated with one of the enabled payment devices 106.

In one embodiment, one of the enabled payment devices 106 is arranged to send the payment account information to a third computer system 112 maintained in a payment processing network which may include VISA™, Mastercard™, American Express™, and the like. Consistent with one or more aspects and/or embodiments of the present invention, one of the enabled payment devices 106 is arranged to record details associated with the payment transaction.

In one embodiment, the third computer system 112 performs clearing and settlement operations using the payment account information from one of the enabled payment devices 106.

In one embodiment, the second computer system 108 is further arranged to send the extracted payment account information to the third computer system 112 maintained in any of the predetermined and well known payment processing network.

In one embodiment, the third computer system 112 performs clearing and settlement operations using the extracted payment account information from the second computer system 108.

In one embodiment, each payment device 106 of the plurality of payment devices 106 is selected from the group comprising a magnetic stripe card, a chip card, an embedded integrated circuit, an RFID-enabled card, a data communication device, a secure element in operative communication with the data communication device, a personal computer, and a point-of-sale device. The RFID sticker 102, by itself, may also act as one of the payment devices 106, being the primary payment device 106 according to aspects of the present invention, if the RFID sticker 102 is so arranged in such a manner that it is payment-enabled through any appropriate mechanism.

In one embodiment, the payment accounts 104-*a* are selected from the group comprising a direct deposit account, a savings account, a debit account, a credit account, a checking account, a cash account, a prepaid account, a money market account, and a loyalty account. It is to be understood and appreciated that other electronic or digital accounts may be arranged suitable for use in one or more aspects of the present invention including the system 100.

In one embodiment, the RFID sticker 102 may be linked to a further RFID sticker (similar to what is illustrated in FIG. 2) likewise acting as one of the payment devices 106. The RFID sticker 102 may be predeterminedly designated as the primary payment device 106 according to various aspects of the present invention.

In one embodiment, the RFID sticker 102 may comprise hardware and software application programs which characterize a digital ledger system for capturing and storing records associated with the payment transaction. This digital ledger system may correspond to the one fully disclosed in International Application No. PCT/IB2016/057862 filed on 21 Dec. 2016 by Renato C. Valencia and entitled "Method of, system for, data processing device, and integrated circuit device for implementing a distributed, ledger-based processing and recording of an electronic financial transaction," the full content of which is incorporated herein by reference in its entirety and for all purposes.

In one embodiment, using mobile applications and other Internet-enabled device, the balances associated with the payment accounts 104-*a* can be transferred from one of the payment accounts 104-*a* to another of one of the payment accounts 104-*a*.

In another embodiment, a minimum balance associated with one payment account 104-*a* may be required to ensure passing through the passageway system such as, for example, a tollway system without the need to reload or replenish with additional balance the payment account 104-*a* such as one that is embedded in a prepaid card or any similar well known payment device.

For ease of conducting a payment transaction, the minimum balance, as mentioned, may be required. Preferably, the minimum balance requirement should be replenished automatically. Alternatively, the minimum balance requirement may be replenished manually. The automatic and manual replenishment may be desirably chosen by the account holder or preconfigured in the herein disclosed system 100. This replenishment could be online or through short-range, medium-range, or long-range communications under various communication models such as P2P (peer-to-peer) model.

The herein disclosed linked, integrated, interchangeable payment system (LIIPS) enabled for conducting payment transactions may be arranged such that it allows real-time reloading of the prepaid card through a mobile phone or similar device. The source of the reload may come from an authorized credit, debit or prepaid card or even a regular bank account if the issuer is a bank or any similar institution which may or can accept deposits or advances.

The herein disclosed linked, integrated, interchangeable payment system (LIIPS) and its associated exemplary embodiments, through mobile or similar applications, may also provide real time checking of balances of the payment devices or payment accounts, transaction history, status of payment devices and payment accounts, location-based services, and other types of information or services.

According to another aspect of the present invention, and consistent with various preferred and exemplary embodiments thereof, there is disclosed a computer-implemented method of enabling the payment transaction to be conducted in the herein disclosed linked, integrated, interchangeable payment system (LIIPS) including a passageway payment system using, as the primary payment device 106, the RFID sticker 102 secured to the vehicle, wherein the RFID sticker 102 has the antenna 200 and the RFID circuitry 202 coupled to the antenna 200.

The first step of the method comprises linking, by the first computer system 104 maintained in the financial institution, the RFID sticker 102 to the plurality of payment devices 106, including senior citizen or student passes, one day, one week, one month, or one year passes, tickets, or any of their equivalents, by matching and storing in the memory system of the first computer system 104 the RFID sticker identifier 102-*a* associated with the RFID sticker 102 and the payment device identifier 106-*a* associated each payment device 106 of the plurality of payment devices 106.

The second step of the method comprises referencing, by the first computer system 104, the RFID sticker identifier 102-*a* to one or more electronic payment accounts 104-*a* held at the first computer system 104 and associated with each payment device 106.

The third step of the method comprises arranging, by the first computer system 104, the payment accounts 104-*a* to be enabled for use in the payment transaction in a priority order if there are two or more of the payment accounts 104-*a*.

The fourth step of the method comprises causing, by the first computer system 104, each payment account 104-*a* to be enabled or disabled for use in the payment transaction.

The fifth step of the method comprises interrogating, by the RFID interrogator 110 connected to the second computer system 108 maintained in the passageway payment system, the RFID circuitry 202 through the antenna 200 as and when the vehicle moves into or approaches the periphery of the RFID interrogator 110 associated with the second computer system 108.

The sixth step of the method comprises acquiring, by the second computer system 108, the RFID sticker identifier 102-*a* through the interrogated RFID circuitry 202 of the RFID sticker 102.

The seventh step of the method comprises extracting, by the second computer system 108, from the acquired RFID sticker identifier 102-*a* payment account information associated with one of the enabled payment accounts 104-*a* according to the priority order and associated with one of the enabled payment devices 106 in the possession of a driver driving the vehicle which passes through the RFID interrogator 110 associated with the second computer system 108 and located in the passageway such as a tollway.

In one embodiment, the herein disclosed method may further comprise the step of sending, by the one of the enabled payment devices 106, the payment account information to the third computer system 112 maintained in a payment processing network 112. The third computer system 112 and the payment processing network 112 may refer to a single network comprising different entities.

In one embodiment, the herein disclosed method may further comprise the step of performing, by the third computer system 112, clearing and settlement operations using the payment account information from the one of the enabled payment devices 106.

In one embodiment, the herein disclosed method may further comprise the step of sending, by the second computer system 108, the extracted payment account information to the third computer system 112 maintained in the payment processing network 112.

In one embodiment, the herein disclosed method may further comprise the step of performing, by the third computer system 112, clearing and settlement operations using the extracted payment account information from the second computer system 108.

In one embodiment, and consistent with the method of the present invention, the step of sending the payment account information to the third computer system 112 authorizes the payment transaction against the one of the enabled payment accounts 104-*a* according to the priority order which may be predetermined, preconfigured, or customizable. The authorization may be pre-authorized or pre-approved by issuers.

In one embodiment, and consistent with the method of the present invention, the step of causing the payment account 104-*a* to be enabled or disabled for use in the payment transaction includes de-linking the RFID sticker 102 from the payment device 106.

In one embodiment, and consistent with the method of the present invention, the de-linking of the RFID sticker 102 from the payment device 106 includes de-referencing the RFID sticker identifier 102-*a* from the one or more payment accounts 104-*a* associated with the payment device 106.

In one embodiment, and consistent with the method of the present invention, the step of performing clearing and settlement operations using the payment account information from the one of the enabled payment devices 106 includes communicating, by the third computer system 112, with the first computer system 104. The communication may be over any suitable data communication network such as the Internet, wide area network (WAN), or the like.

In some embodiments, and consistent with the method of the present invention, the priority order in which the payment accounts 104-*a* are arranged to be enabled for use in the payment transaction is predefined according to predetermined or pre-arranged user preference levels, and the same priority order may be adaptively derived according to these user preference levels.

In one embodiment, using mobile and similar applications and consistent with the method of the present invention, the balances associated with the payment accounts 104-*a* can be transferred from one of the payment accounts 104-*a* to another of the payment accounts 104-*a*. In this regard, the payment devices 106 may be arranged to transfer funds/loads/balances/points/tokens to one another (e.g., under peer-to-peer connection) provided that all of the payment transactions emanating from the same payment devices 106 proceed to a central clearing and settlement bank or any service provider of the same nature and/or character.

Figure 3:
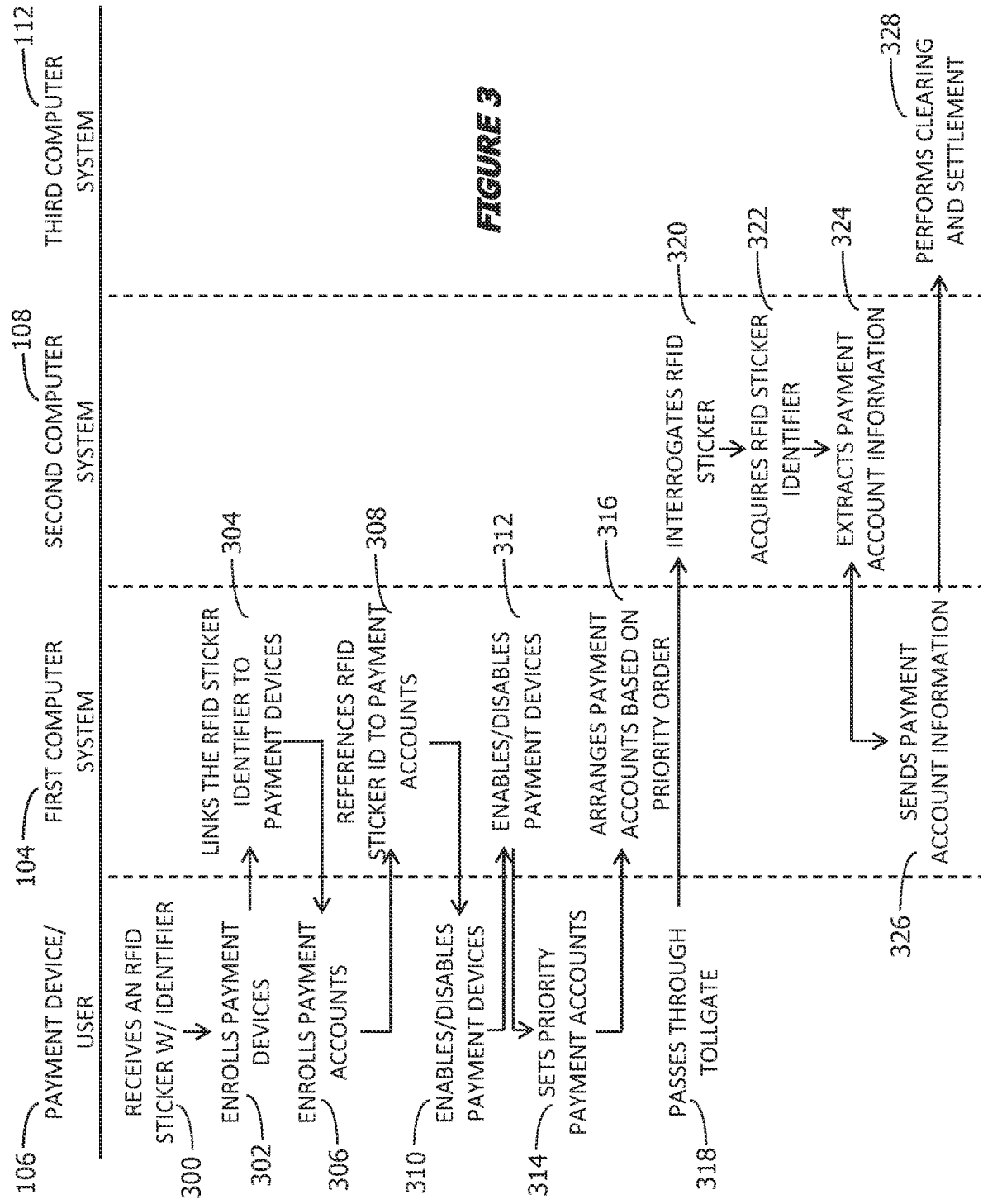
FIG. 3 is a flow diagram illustrating an exemplary operation suitable for use in one or more aspects of the invention.

Referring now to FIG. 3, there is shown a flow diagram which illustrates an exemplary operation suitable for use in one or more aspects and one or more embodiments of the present invention. The operation, as illustrated, may start when a user receives the RFID sticker 102 having the RFID sticker identifier 102-*a* (step 300). The RFID sticker 102 may be issued by an issuer which may be a financial institution such as a bank or a passageway payment system operator such as a tollway system operator.

Additionally, or alternatively, the issuance of the RFID sticker 102 may be done by any accredited issuer or any of its authorized merchants or agents. In this regard, it can be presumed that the authorized merchants (e.g., different tollway, parking, and facility operators) agree to the use of standard RFID stickers 102, RFID interrogators 110, RFID readers 500 (later appearing in FIG. 5 of the ensuing disclosure of the present invention), and other primary or support accessories as may be deemed fit for use in the herein disclosed passageway payment system in which various types of payment transactions are enabled to be conducted with ease.

The issuance of the RFID sticker 102 and its corresponding RFID sticker identifier 102-*a*, in turn, may enable the user to enroll his or her payment devices 106 such as, for example, credit card, debit card, and mobile phone (step 302).

The enrollment of the payment devices 106 may be conducted in various ways. One of which is through an online platform maintained by the issuer and accessible by the user over the Internet. Another is over the counter in a physical facility of the issuer wherein a human assistant such as a teller is permitted to access the online platform and perform the enrollment based on the information associated with the payment devices 106.

The enrollment of the payment devices 106 may involve linking, by the first computer system 104 maintained in and by the financial institution, of the RFID sticker identifier 102-*a* to the same payment devices 106 (step 304). By way of example, the RFID sticker identifier 102-*a* may be linked to a credit card number, a debit card number, or a mobile phone number.

The credit and debit card numbers may be those that consist of a string of numbers which are normally printed on the face of the credit and debit card. The mobile phone number, on the other hand, may refer to a SIM (subscriber identifier module) card number or IMEI (International Mobile Equipment Identity) number which is commonly issued by a Telecommunication company.

Subsequently, the user may enroll his or her payment account or payment accounts 104-*a* associated with one or more of the payment devices 106 he or she previously enrolled (step 306). The enrollment of the payment accounts 104-*a* may be conducted in the same way that the enrollment of the payment devices 106 can be conducted as described above, and may include referencing, by the first computer system 104 maintained in and by the financial institution, the RFID sticker identifier 102-*a* to each of the enrolled payment accounts 104-*a* (step 308).

For example, the RFID sticker identifier 102-*a* may be referenced to the credit account number associated with the credit card number, to the debit account number associated with the debit card number, or to one or more of prepaid account numbers, credit account numbers, or debit account numbers which may be stored on the SIM card of the mobile phone.

It is to be understood and appreciated that the RFID sticker 102 along with the example prepaid card and its associated prepaid card account, the example credit card and its associated credit card account, or the example debit card and its associated debit card account to which the RFID sticker 102 is either linked or referenced may be sponsored or guaranteed by any appropriate payment processing network consisting of different entities (e.g., Visa™, Mastercard™, JCB™, American Express™, etc.).

The prepaid account, credit account, or debit account associated with the mobile phone is preferably enabled for use in payment transactions using the system for or method of implementing a distributed, ledger-based processing and recording of an electronic financial transaction disclosed in international application no. PCTIB2016057862 filed on Dec. 21, 2016 by Renato C. Valencia, or the transaction device for, a control circuit for, and a method of enabling electronic financial transactions via a near-field communication infrastructure disclosed in international application no. PCT/IB2015/055897 filed on Aug. 3, 2015 by Renato C. Valencia, the full content of each of which is incorporated herein by reference in its entirety and for all purposes.

Once the payment devices 106 are linked to the RFID sticker identifier 102-*a* and the one or more payment accounts 104-*a* associated with each of the payment devices 106 are referenced to the RFID sticker identifier 102-*a*, the user has the option to enable or otherwise disable the payment devices 106 (step 310).

The first computer system 104 associated with the financial institution may then perform enabling or otherwise disabling of any of the payment devices 106 in accordance with the instruction of the user (step 312). This enabling operation or otherwise disabling operation can be conducted via the electronic platform or over-the-counter through the assistance of a human assistant such as a teller situated in a financial institution such as a bank.

For each enabled payment devices 106, their associated payment account 104-*a* or payment accounts 104-*a* can be set in priority order through a request from the user and the first computer system 104 processing the request from the user (steps 314, 316).

The priority order may be set such that, if the first payment account 104-*a* of the payment accounts 104-*a* becomes inoperable for whatever reason including lack of sufficient balance to settle the required fees for the use of one particular passageway, then the information associated with the second payment account 104-*a* in the priority order will automatically be read and captured by the RFID interrogator 110 located in the passageway such as a tollway.

In some embodiments, when the primary payment device 106, be it a magnetic strip card, a chip card, an RFID sticker, a mobile phone, etc., does not have sufficient balance to pay for any purchase of any goods or services, the herein disclosed linked, integrated interchangeable payment system enables the payment device holder to pay the bill with any of his other registered and linked payment devices 106 that have at least sufficient balance.

The captured information associated with the second payment account 104-*a* may then be transmitted to the third computer system 112 in the payment processing network, wherein the third computer system 112 performs clearing and settlement operations using the second payment account information.

It is to be understood and appreciated that, where any technical glitch occurs in any portion of the herein disclosed computer-based system 100 and associated computer-implemented method, cash payments may be accepted at the toll station associated with the second computer system 108.

In operation, when the vehicle passes through a tollgate for example (step 318), the second computer system 108 interrogates the RFID sticker 102 using the RFID interrogator 110 (step 320), whereby the second computer system 108 acquires the RFID sticker identifier 102-*a* associated with the RFID identifier 102 (step 322) and consequently extract from the acquired RFID sticker identifier 102-*a* the payment account information which is/are linked to the same RFID sticker identifier 102-*a* (step 324).

The extracted payment information may be transmitted from the second computer system 108 to the first computer system 104 over any suitable communication link such as short-range, medium-range or long-range communication link. This, in turn, triggers the first computer system 104 to transmit the payment account information to the third computer system 112 (step 326) over any suitable communication network such as the Internet.

Clearing and settlement operations are then performed by the third computer system 112 using and/or based on the payment account information (step 328). Cleared and settled payments may be shared by and between the first, second, and third computer systems 104, 108, 112 over any suitable communication network such as the Internet or any IEEE-802 based data communication network which is well known in the art of electronic communications.

Figure 4:
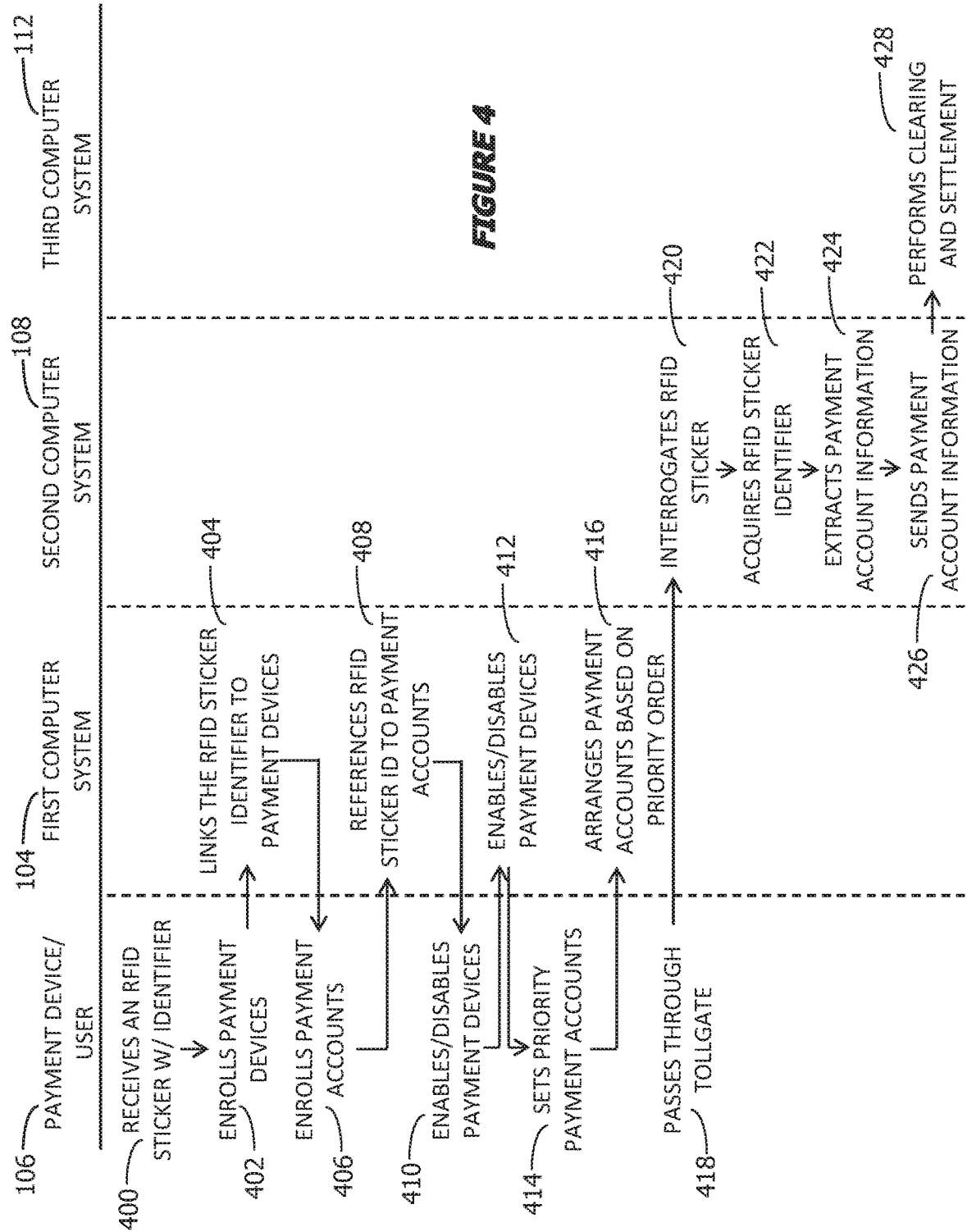
FIG. 4 is a flow diagram illustrating another exemplary operation suitable for use in one or more aspects of the invention.

Referring now to FIG. 4, there is shown a flow diagram which illustrates another exemplary operation suitable for use in one or more aspects of the present invention. The another exemplary operation, which is consistent with one or more aspects and one or more embodiments of the present invention, may start by receiving, by the user, the RFID sticker 102 with an associated identifier 102-*a* which is unique to the RFID sticker 102 (step 400), and may continue with enrolling, by the user of the payment devices 106, the payment devices 106 (step 402) which in turn causes the first computer system 104 to link the RFID sticker identifier 102-*a* to the payment devices 106 and more particularly to the likewise unique identifiers 106-*a* of the payment devices 106 (step 404).

Subsequently, the user may enroll the payment accounts 104-*a* associated with any one or more of the payment devices 106 (step 406) which in turn causes the first computer system 104 to reference the RFID sticker identifier 102-*a* to the payment accounts 104-*a* and more particularly to the likewise unique identifiers or numbers associated with the payment accounts 104-*a* (step 408).

The payment devices 106 carrying the payment accounts 104-*a* may be enabled or disabled by the first computer system 104 based on request from the user (steps 410, 412). Meanwhile, the payment accounts 104-*a* may be set or arranged in a priority order likewise based on request from the user (steps 414, 416).

In operation, when the vehicle passes through any fee-based passageway system such as a tollgate (step 418), the second computer system 108 maintained in the tollgate interrogates the RFID sticker 102 (step 420) and, consequently, acquires the RFID sticker identifier 102-*a* associated with the RFID sticker 102 (step 422), extracts from the acquired RFID sticker identifier 102-*a* the payment account information associated with the same RFID sticker identifier 102-*a* (step 424), and directly sends the payment account information to the third computer system 112 which may be maintained in and by the payment processing network 112 or any predetermined third party processor (step 426).

Clearing and settlement operations are then performed by the third computer system 112 using and/or based on the payment account information (step 428). Cleared and settled payments may be shared by and between the first, second, and third computer systems 104, 108, 112 over any suitable communication network such as the Internet or any IEEE-802 based data communication network which is well known in the art of electronic communications.

Figure 5:
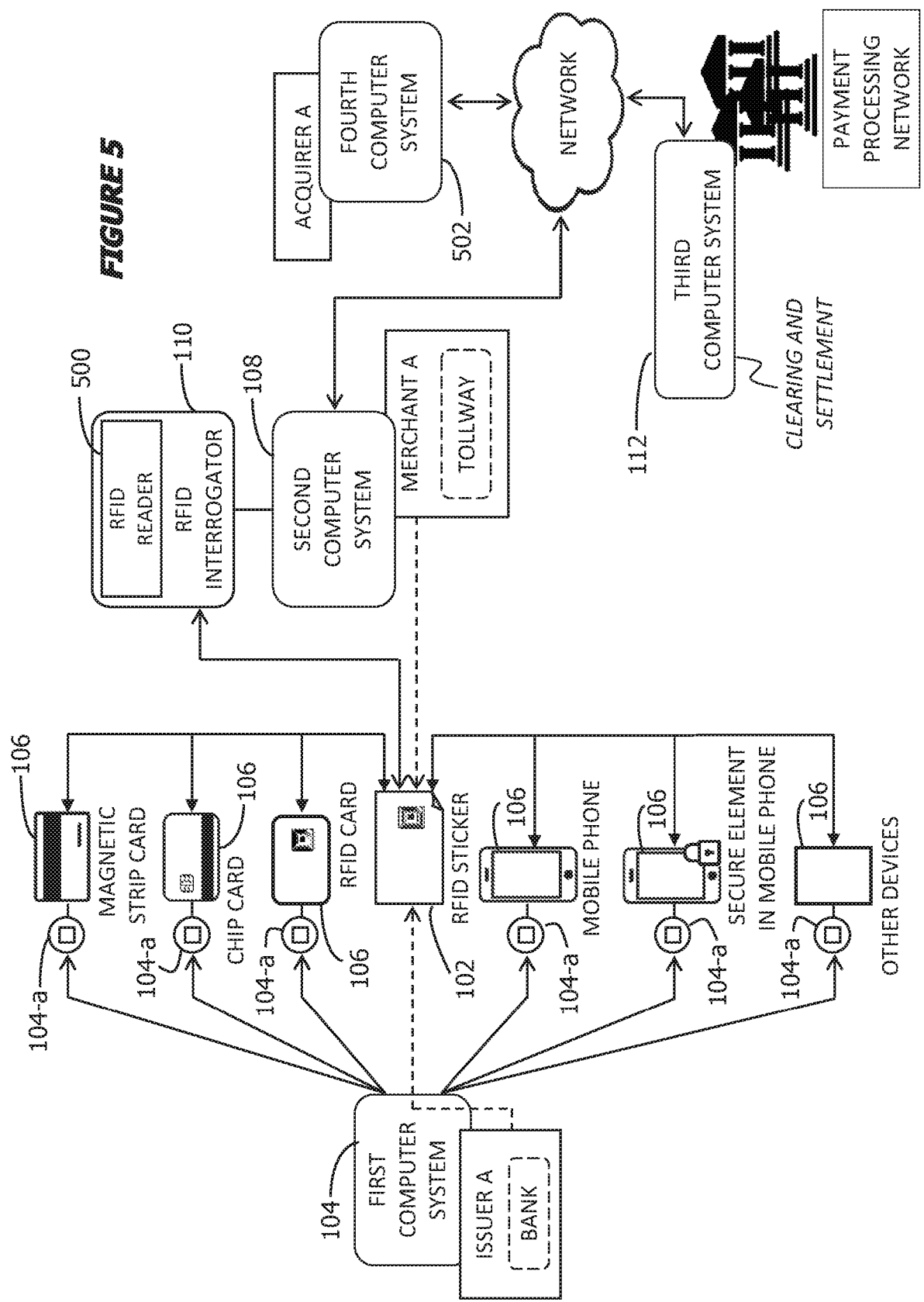
FIG. 5 is a high-level block diagram illustrating a single payment channel link between the RFID sticker illustrated in FIGS. 1 and 2 and payment devices carrying payment accounts.

Referring to FIG. 5, there is shown a high-level block diagram which illustrates a single payment channel link between the RFID sticker 102 and payment devices 106 carrying payment accounts 104-*a*. As illustrated, issuer "A" such as a bank, which maintains the first computer system 104, issues the payment accounts 104-*a* embedded in or associated with the payment devices 106.

In an example embodiment, the unique identifiers or numbers representative of the payment accounts 104-*a* which are issued and maintained by the bank may be mirrored on a data storage structure of the RFID sticker 102 or on an external data storage structure linked or coupled to the RFID sticker 102.

In effect, issuer "A" issues the payment devices 106 which may be in various forms such as magnetic strip card, chip card, RFID card, RFID sticker, payment-enabled mobile phone, payment-enabled secure element in a mobile phone, or such other forms of payment devices which may be well known in the art.

The RFID sticker 102 may be likewise issued by issuer "A." However, it is preferable that merchant "A" such as a tollway operator, which maintains the second computer system 108, issues the RFID sticker 102. Contingent upon an agreement between the issuer "A" and merchant "A," the RFID sticker 102 may be linked to each or any one or more of the payment devices 106 and effectively to their respective payment accounts 104-*a* through the first computer system 104 maintained by issuer "A."

As mentioned, there may be a contractual agreement among the members of, or participating parties to, the payment processing network maintaining the third computer system 112 or, simply, payment community to honor and electronically recognize the herein disclosed linked, integrated, interchangeable payment system (LIIPS) which may be characterized by an open-loop system (e.g., consisting of multi-issuers, merchants, acquirers, third party processors, and clearing and settlement banks, among others).

As an example, the RFID sticker 102 may be accepted as one of the enabled payment devices 106 by one merchant which could be a tollway operator in the following arrangement or configuration: (i) all registered/linked payment devices 106 can manually or automatically replenish balance on the RFID sticker 102 or balance on any one of the enabled payment account 104-*a* referenced to the RFID sticker 102; and (ii) the RFID sticker 102 could be arranged to transfer the payment liability to any one of the payment devices 106 as registered by the owner or holder of the RFID sticker 102 effectively causing that payment device 106 to be linked to the RFID sticker 102. For example, in a case where a senior pass/ticket acts as one of the payment devices 106, the RFID sticker 102 may be used to designate that senior pass/ticket as the payment device 106 whereby an acquirer or merchant such as a passageway operator can and is enabled to collect directly from issuer of said senior pass/ticket if and when a vehicle exits through a fee-based passageway.

The RFID sticker 102 may be readable by an RFID reader 500 which may form part of the RFID interrogator 110 associated with the second computer system 108. Through the link between the RFID sticker 102 and the payment devices 106 carrying the payment accounts 104-a, the payment accounts 104-a may be captured and read by the RFID interrogator 110 through the RFID reader 500. It is, based on a priority order, from any of the enabled or active payment accounts 104-a where the toll fees may be charged against.

The charging of the toll fees may be at the entrance portion of the tollway if the toll fees are set at fixed rates. Alternatively, the charging of the toll fees may be at the exit portion of the tollway if the toll fees are variable and depending on various factors such as travelled distance, type and/or size of the vehicle, traversed number of toll stations or toll gates, weight of the passing vehicle, type or weight of the load of the vehicle, and the like.

Effectively, the second computer system 108 may act as part of the herein disclosed linked, integrated, interchangeable payment system (LIIPS) wherein included therein is a subsystem for measuring cargoes if cargoes are charged additionally.

The second computer system 108 receives the payment account 104-a through the RFID interrogator 110 and determines the chargeable fees.

The use of any of the enabled payment devices 106 and associated payment accounts 104-a against which the toll fees may be charged may require at least one authentication mechanism such as a one-time password, a personal identification code (PIN) code, a biometric recognition, or the like, in order to authenticate the true and real owners of the payment accounts 104-a.

Alternatively, multimodal authentication mechanisms may also be used to authenticate the authorized owners or holders of the payment accounts 104-a maintained in the financial institutions, linked to the RFID sticker 102, and/or mirrored on the data storage structure of the RFID sticker 102 secured to the vehicle.

The payment account 104-a and the chargeable fees, along with other pertinent information such as date and time, all together form payment related information. It is to be understood and appreciated that the RFID sticker 102 may be linked to, or associated with, the vehicle passing through the RFID interrogator 110 by way of the information inherent to the vehicle. These vehicle information may include, by way of example, the vehicle's certificate of registration, vehicle's plate number, vehicle type (car, truck, motorcycle, boat, plane, etc.), vehicle's make or model, or the like.

The second computer system 108 acting as part of the herein disclosed linked, integrated, interchangeable payment system (LIIPS) may have a vehicle identification system that identifies the vehicle through any one or more of the aforementioned information inherent to the vehicle or other information associated with the vehicle.

The second computer system 108 transmits the above-mentioned examples of payment related information to the third computer system 112 maintained by the payment processing network over the Internet or any suitable communication network which is well known in the art. Together with the fourth computer system 502 maintained in and by the acquirer "A," the payment processing network 112 processes the payment related information for clearing and settlement in real-time or near real-time over the Internet or any suitable communication network.

In sum, and consistent with one or more embodiments of the present invention, aspects of the present invention may be or may involve use of a complete open or closed loop payment system which may consist of issuers of RFID stickers 102, issuers of the payment devices 106 and the payment accounts 104-a, acquirers, and payment processing networks 112 including third party payment processors (TPP)/gateways, international payment systems such as Visa™, Mastercard™, Union Pay™, JCB International™, American Express™, Discover™, or the like, and clearing and settlement banks. These parties may have agreements and may follow standard protocols on handling payments and payment-related issues.

Figure 6:
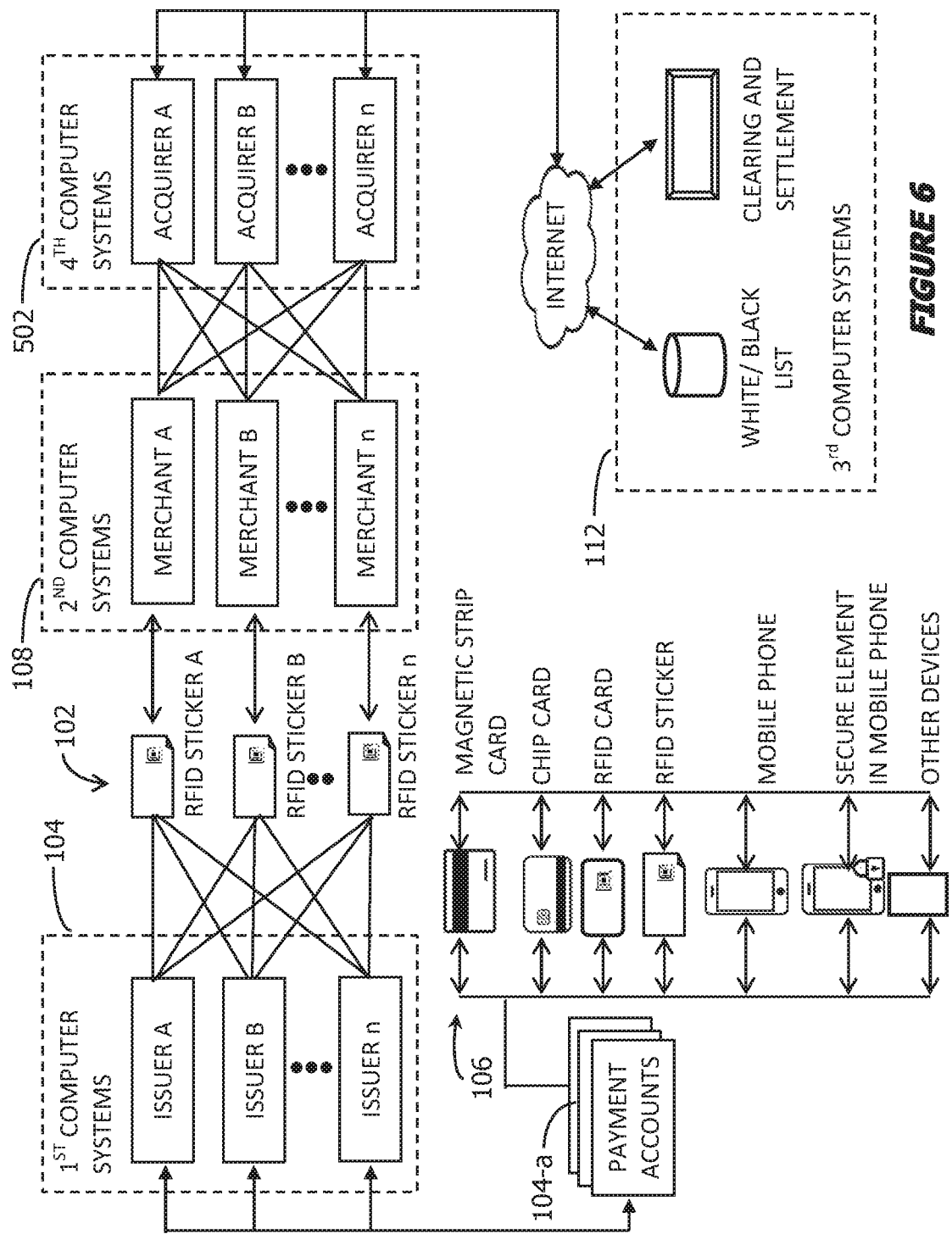
FIG. 6 is a high-level block diagram illustrating an open loop, multiple payment channel links between a plurality of RFID stickers illustrated in FIGS. 1 and 2 and payment devices carrying payment accounts, wherein the herein disclosed payment system envisions multiple issuers, acquirers, merchants, processing companies or payment gateways, and clearing and settlement banks.

Referring to FIG. 6, there is shown a high-level block diagram which illustrates multiple payment channel links between a plurality of RFID stickers 102 and payment devices 106 carrying the payment accounts 104-a, wherein the herein disclosed payment system envisions multiple issuers, acquirers, merchants, processing companies or payment gateways, and clearing and settlement banks. As illustrated, there may be multiple issuers (e.g., issuers "A," "B," . . . n) of various payment devices 106 which are linked to various RFID stickers 102 (e.g., stickers "A," "B," . . . n) through the first computer systems 104 maintained in and by issuers "A," "B," . . . n.

The RFID stickers 102 ("A," "B," . . . n) may be issued by different merchants (e.g., merchants "A," "B," . . . n) such as, for example, different tollway systems. It is to be understood and appreciated that aspects of the present invention may be implemented in various toll-based passageways such as those for ferries, roll-on/roll-off (RORO) ships, planes, carparks, stadium, entertainment or leisure centers, festivals, sports halls, sports grounds, training grounds, museums, social infrastructure hubs, parks, events areas, events centers, events halls, and the like. In this regard, the RFID sticker 102 may be linked not only to a single payment system but also to multiple payment systems.

The second computer systems 108 associated with the merchants "A," "B," . . . n may fetch payment account information from the RFID stickers 102 ("A," "B," . . . n) and may transmit the same payment account information to the third computer systems 112 through the fourth computer systems 502 maintained in and by several acquirers (e.g., acquirers "A," "B," . . . n) for clearing and settlement. White-list and black-list may also be determined through the third computer systems 112 based on the historical data of each of the payment accounts 104-a in respect of payment transactions.

Figure 7:
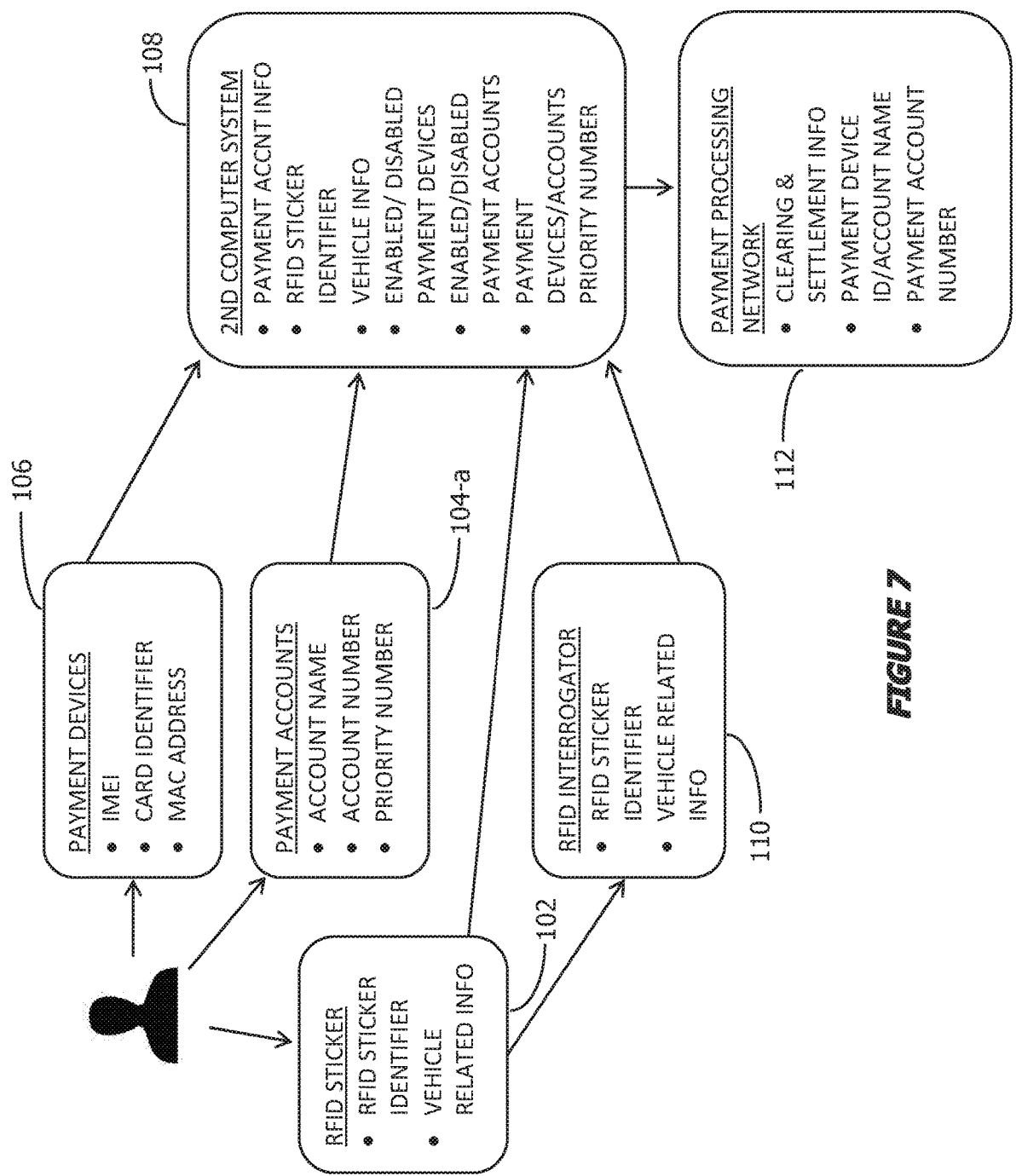
FIG. 7 is a data representation diagram illustrating, by way of example, a view of payment transaction related information consistent with one or more embodiments of the invention.

Referring to FIG. 7, there is shown a data representation diagram which illustrates, by way of example, a view of payment transaction related information consistent with one or more embodiments of the present invention.

Depending on the type, nature kind, and specification of each of the payment devices 106, the payment device 106 may have, by way of examples, IMEI (International Mobile Equipment Identity) information, card identifier information, and MAC (media access control) address information.

The RFID sticker 102 may have, by way of examples, the RFID sticker identifier information and as well as vehicle related information such as registration number, plate number, color code, emblem representation, make, and model.

The payment accounts 104-a may have, by way of examples, account name information, account number information, and priority number information. The RFID interrogator 110 associated with the second computer system 108 may have, by way of examples, RFID sticker identifier information and, possibly, vehicle related information similar to what are stored on the RFID sticker 102.

The second computer system 108 may have, by way of examples, payment account information, RFID sticker identifier information, vehicle related information, information on enabled or otherwise disabled payment devices 106, information on enabled or otherwise disabled payment accounts 104-*a,* and information on the priority numbers associated with any or both of the payment devices 106 and payment accounts 104-*a.*

The payment processing network 112 which may comprise different parties such as third party processors and clearing and settlement banks, may have, by way of examples, clearing and settlement information, payment device identifier information, payment account name information, and payment account number information. It is to be understood and appreciated that other payment related information may be contained in the payment processing network 112 and may be shared among the parties of the same payment processing network 112.

Figure 8:
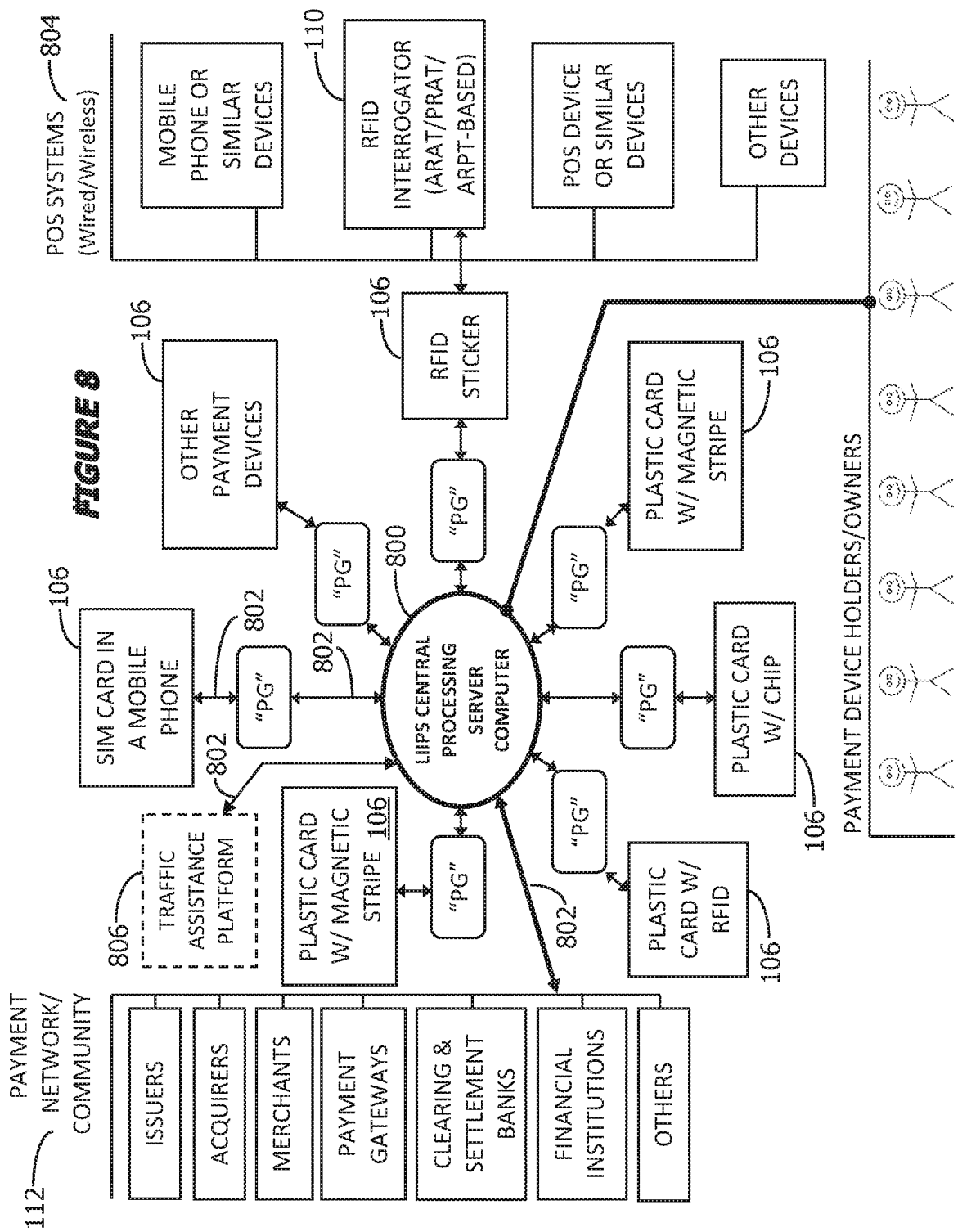
FIG. 8 is a block diagram illustrating a high level architecture of an alternative computer-based system for enabling a payment transaction to be conducted in a linked, integrated, interchangeable payment system that is consistent with one or more aspects of the invention.

Referring to FIG. 8, there shown a block diagram which illustrates a high level architecture of an alternative computer-based system for enabling a payment transaction to be conducted in the herein disclosed linked, integrated, interchangeable payment system (LIIPS) that is consistent with one or more aspects and as well as one or more embodiments of the present invention.

The alternative computer-based system as illustrated in FIG. 8 mainly includes a central processing server computer 800 which may act as a data processing center and/or may contain a management information system and a decision support system for the herein disclosed linked, integrated, interchangeable payment system (LIIPS) in accordance with exemplary embodiments.

The payment devices 106, the point-of-sale (POS) system 804, and the payment processing network 112 or payment community may communicate with one another in the central processing server computer 800 over the data communication network 802 which may be the well known Internet.

Consistent with one or more aspects and various embodiments of the present invention, the central processing server computer 800 may be arranged to cause sending of a notification (e.g., via SMS or email) to any computing device if a balance associated with any one of the enabled payment devices 106 falls below a minimum predetermined threshold, or if any one of the enabled payment devices 106 or payment accounts 104-*a* as illustrated in FIG. 1 becomes inactive for whatever reason such as dormancy.

The payment devices 106 may include, by way of examples, the SIM card in a mobile phone 106, the plastic card with magnetic stripe 106, the plastic card with RFID 106, the plastic card with chip 106, the plastic card with magnetic stripe 106, the RFID sticker 106, NFC (Near Field Communications) enabled mobile phone, and such other payment devices 106 which are well known in the art. Each of these payment devices 106 may communicate with the server computer 800 over the data communication network 802 while passing through a predetermined payment gateway "PG."

Consistent with one or more aspects and various embodiments of the present invention, any one or more of the illustrated payment devices 106 and such other payment devices can be engaged in a point-of-sale (POS) transaction at the POS system 804 which may include, or may be any of, at least one of payment computer unit, at least one payment mobile unit, and at least one payment terminal unit. Any of these payment and/or payment-enabled computer unit, mobile unit, and terminal unit may be in the form of a mobile phone, stationary POS device, portable POS device, and the like.

Consistent with one or more aspects and various embodiments of the present invention, the RFID interrogator 110, all by itself, may serve as one of the POS systems. The RFID interrogator 110, which is also well known as RFID reader, may have an antenna for communications with the RFID sticker 102 as disclosed in detail in FIGS. 1 and 2. These communications between the RFID interrogator 110 and the RFID sticker 102 through their respective antennas may be based on ARAT (Active Reader, Active Tag), PRAT (Passive Reader Active Tag), ARPT (Active Reader, Passive Tag) depending on various preferred configurations associated with location, operation, environment, and reading coverage.

Furthermore, and consistent with one or more aspects and various embodiments of the present invention, the central processing server computer 800 is connected to a traffic assistance platform 806, which may be or may be based on, by way of examples, Google Maps™, Apple Maps™, Waze™, and the like, or any GPS (Global Positioning System) based mapping or navigation systems, over the data communication network 802.

The traffic assistance platform 806 may be arranged to provide physical location of each vehicle passing, for example, though a passageway such as a tollway for the purpose of real-time monitoring and audit trail, or such other location-based services which are well known in the art. Any desirable portion of the herein disclosed passageway payment system may also be connected to the traffic assistance platform 806.

The central processing server computer 800 may be arranged and/or configured such it is accessible by holders or owners of the payment devices 106 from any computing device (e.g., laptop computers and mobile phones) using any suitable software application (e.g., web browsers and mobile apps). The mobile apps, for example, may be arranged to allow peer-to-peer transfer of funds in a real-time or near real-time manner and transaction monitoring and audit trail likewise in a real-time or near real-time manner.

It is to be understood and appreciated that any payment device 106 could be set as a primary payment device 106 provided that the latter is compatible with the RFID interrogator 110 or with the POS system which may include POS devices in various forms, and that all registered and enabled payment devices 106 can be used for payment transactions in real-time or near real-time and can be monitored also in real-time or near real-time in the server computer 800 for their associated and respective balances, transaction histories, fund transfer transactions/confirmations, active statuses (i.e., white-list) and/or inactive statuses (i.e., black-list).

Figure 9:
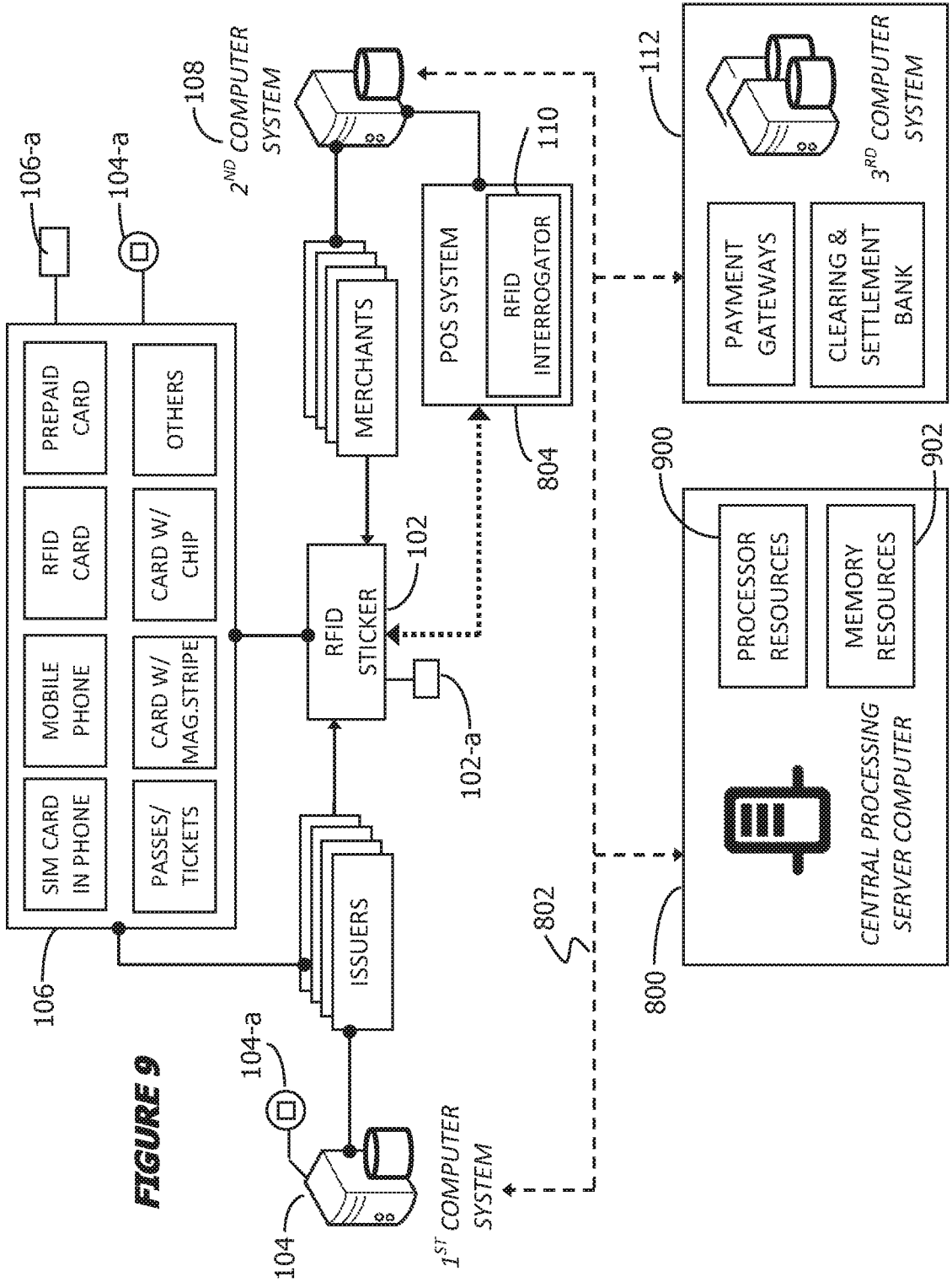
FIG. 9 is a block diagram illustrating a typical central processing server computer that may be provided according to some embodiments as part of one or more aspects of the invention.

Referring now to FIG. 9, there is shown a block diagram which illustrates the typical central processing server computer 800 that may be provided according to some embodiments as part of one or more aspects of the invention. The central processing server computer 800 is arranged for enabling a payment transaction to be conducted in the herein disclosed linked, integrated, interchangeable payment system (LIIPS) which may include a passageway payment system using, as the primary payment device, the radio-frequency identification (RFID) sticker 102.

The RFID sticker 102 is preferably secured to any vehicle, and has the antenna 200 and the RFID circuitry 202 coupled to the antenna 200, a preferred and example structure of which is illustrated in greater detail in FIG. 2.

Consistent with one or more aspects and various embodiments of the present invention, the server computer 800 comprises processor resources 900 and memory resources 902 coupled to the processor resources 900 and configured to direct the processor resources 900 to firstly link the RFID sticker 102 to the plurality of payment devices 106 by matching and storing in the memory resources 902 the RFID sticker identifier 102-*a* associated with the RFID sticker 102 and the payment device identifier 106-*a* associated with each payment device 106 of the plurality of payment devices 106.

Consistent with one or more aspects and various embodiments of the present invention, the processor resources 900 are directed to secondly reference the RFID sticker identifier 102-*a* to one or more payment accounts 104-*a* held at the first computer system 104 with which the server computer 800 communicates over the communication network 802 and associated with each payment device 106.

Consistent with one or more aspects and various embodiments of the present invention, the processor resources 900 are directed to thirdly cause each payment device 106 to be enabled or disabled for use in the payment transaction.

Consistent with one or more aspects and various embodiments of the present invention, the processor resources 900 are directed to fourthly arrange the payment accounts 104-*a* to be enabled for use in the payment transaction in a priority order if there are two or more of the payment accounts 104-*a*.

Consistent with one or more aspects and various embodiments of the present invention, the processor resources 900 are directed to fifthly communicate, over the communication network 802, with the second computer system 108 maintained in the passageway payment system such as a tollway system operated by a tollway operator.

Consistent with the typical central processing server computer 800 that may be provided according to some embodiments as part of one or more aspects of the present invention, the second computer system 108 may have the RFID interrogator 110, may be arranged to interrogate the RFID circuitry 202 through the antenna 200 as and when the vehicle moves into the periphery of the RFID interrogator 110, may be further arranged to acquire the RFID sticker identifier 102-*a* through the interrogated RFID circuitry 202, and may be caused to extract from the acquired RFID sticker identifier 102-*a* payment account information associated with one of the enabled payment accounts 104-*a* according to the priority order and associated with one of the enabled payment devices 106. The RFID interrogator 110 may act as the POS system 804, all by itself, having its own antenna for communication with the RFID sticker 102.

Consistent with the typical central processing server computer 800 that may be provided according to some embodiments as part of one or more aspects of the present invention, one of the enabled payment devices 106 may send the payment account information to the third computer system 112 maintained in the payment processing network which may include payment gateways and clearing and settlement banks, among others.

Alternatively, the second computer system 108 may send the extracted payment account information to the third computer system 112 maintained in the payment processing network. In any of these cases, the third computer system 112 can be triggered to perform clearing and settlement operations using the payment account information from the one of the enabled payment devices 106.

The RFID sticker 102 may be issued either by one of the merchants which may be a tollway operator or by one of the herein disclosed issuers which may be a financial institution.

Through the data communication network 802, the central processing server computer 800 is enabled to fetch and collect passageway and/or payment related data from various sources which may include the first, second, and third computer systems 104, 108, and 112, respectively, and to further cause the same passageway and/or payment related data to be accessible from any suitable computing device (e.g., mobile phone) using a web-based or mobile-based application executing on the computing device.

The processor resources 900 may be a data processing unit capable of fetching and executing the computer-executable instructions from the memory resources 902. The memory resources 902 is preferably a non-transitory computer-readable storage medium having the computer-executable instructions embodied thereon.

The web-based application and/or the mobile-based application referred to in FIG. 8 may be stored on the memory resources 902 such that the computer-executable instructions include instructions associated with the web-based application and/or the mobile-based application or simply "mobile app." These instructions can be fetched and executed by the processor resources 900, and can be accessed by any computing device connected to the server computer 800 over the communication network 802, and capable of executing any of the web-based application and the mobile-based application depending on the configuration of the computing device.

In the server computer 800 aspect of the present invention, the one of the enabled payment devices 106 is arranged to send the payment account information to a third computer system 112 maintained in a payment processing network.

In the server computer 800 aspect of the present invention, the third computer system 112 performs clearing and settlement operations using the payment account information from the one of the enabled payment devices 106.

In the server computer 800 aspect of the present invention, the server computer 800, the second computer system 108 is further arranged to send the extracted payment account information to the third computer system 112 maintained in a payment processing network.

In the server computer 800 aspect of the present invention, the third computer system 112 performs clearing and settlement operations using the extracted payment account information from the second computer system 108.

In the server computer 800 aspect of the present invention, each payment device 106 is selected from the group comprising the magnetic stripe card, the chip card, the embedded integrated circuit, the RFID-enabled card, the data communication device, the secure element in operative communication with the data communication device, the personal computer, and the point-of-sale device.

In the server computer 800 aspect of the present invention, the payment accounts 104-*a* are selected from the group comprising the direct deposit account, the savings account, the debit account, the credit account, the checking account, the cash account, the prepaid account, the money market account, and the loyalty account.

In the server computer 800 aspect of the present invention, the RFID sticker 102 secured to the vehicle is detachably attached to the vehicle.

In the server computer 800 aspect of the present invention, the RFID sticker 102 acts as one of the payment devices 106 being the primary payment device 106.

In the server computer 800 aspect of the present invention, the RFID sticker 102 is linked to a further RFID sticker acting as one of the payment devices 106.

In the server computer 800 aspect of the present invention, the RFID sticker 102 comprises hardware and software application programs which characterize the digital ledger system for capturing and storing records associated with the payment transaction.

In the server computer 800 aspect of the present invention, balances associated with the payment accounts 104-*a* can be transferred from one of the payment accounts 104-*a* to another of the payment accounts 104-*a*.

In the server computer 800 aspect of the present invention, the one of the enabled payment devices 106 is arranged to record details associated with the payment transaction.

In the server computer 800 aspect of the present invention, the RFID interrogator 110 serves as the point-of-sale (POS) system 804.

In the server computer 800 aspect of the present invention, the payment devices 106 can be engaged in the point-of-sale (POS) transaction at the POS system 804.

In the server computer 800 aspect of the present invention, the payment devices 106, the POS system 804, and the payment processing network 112 communicate with one another through and/or in the central processing server computer 800 over the data communication network 802 which may be the Internet.

In the server computer 800 aspect of the present invention, the first computer system(s) 104, the second computer system(s) 108, the third computer system(s) 112, and the fourth computer system(s) 502 may communicate with one another in the central processing server computer 800 over the data communication network 802.

In the server computer 800 aspect of the present invention, the central processing server computer 800 is connected to the traffic assistance platform 806.

In the server computer 800 aspect of the present invention, the POS system 804 includes any of at least one payment computer unit, at least one payment mobile unit, and at least one payment terminal unit.

The payment transactions enabled to be conducted using the computer-implemented method, the computer-based system 100, and/or the central processing server computer 800 aspects of the present invention with the provision of utilizing the RFID sticker 102 as the primary payment device, or any device similar to it, linked to the various payment devices 106 and referenced to the various payment accounts 104-*a* support an integrated, easy-to-use, cost-efficient, and multi-purpose passageway payment system even where the same payment system normally include a significant number of concerned parties such as issuers, merchants, acquirers, third party processors, international payment systems, and clearing and settlement banks, among others.

While the present invention has been described with respect to a limited number of exemplary embodiments, those skilled in the art, having benefit of this disclosure, will appreciate that other embodiments and/or implementations can be devised which do not depart from the scope of the present invention as disclosed herein.

I claim:

1. A computer-implemented method of enabling a payment transaction to be conducted in a linked, integrated, interchangeable payment system including a passageway payment system using, as a primary payment device, a radio-frequency identification (RFID) sticker secured to a vehicle, the RFID sticker having an antenna and an RFID circuitry coupled to the antenna, the method comprising the steps of:

linking, by at least one first computer system maintained in at least one financial institution, the RFID sticker to a plurality of payment devices by matching and storing in the memory system of the at least one first computer system an RFID sticker identifier associated with the RFID sticker and a payment device identifier associated with each payment device of the plurality of payment devices;

referencing, by the at least one first computer system, the RFID sticker identifier to one or more electronic payment accounts held at the at least one first computer system and associated with the each payment device;

arranging, by the at least one first computer system, the payment accounts to be enabled for use in the payment transaction in a priority order if there are two or more of the payment accounts;

causing, by the at least one first computer system, the each payment account to be enabled or disabled for use in the payment transaction;

interrogating, by an RFID interrogator connected to a second computer system maintained in the passageway payment system, the RFID circuitry through the antenna and when the vehicle moves into the periphery of the RFID interrogator;

acquiring, by the second computer system, the RFID sticker identifier through the interrogated RFID circuitry; and extracting, by the second computer system, from the acquired RFID sticker identifier payment account information associated with one of the enabled payment account according to the priority order and associated with one of the enabled payment devices.

2. The method according to claim 1, further comprising the step of sending, by the one of the enabled payment devices, the payment account information to a third computer system maintained in a payment processing network.

3. The method according to claim 2, further comprising the step of performing, by the third computer system, clearing and settlement operations using the payment account information from the one of the enabled payment devices.

4. The method according to claim 2, wherein the payment devices are engaged in a point-of-sale (POS) transaction at a POS system.

5. The method according to claim 4, wherein the payment devices, the POS system, and the payment processing network communicate with one another in a central processing server computer over a data communication network.

6. The method according to claim 5, wherein the central processing server computer is connected to a traffic assistance platform.

7. The method according to claim 1, further comprising the step of sending, by the second computer system, the extracted payment account information to a third computer system maintained in a payment processing network.

8. The method according to claim 7, further comprising the step of performing, by the third computer system, clearing and settlement operations using the extracted payment account information from the second computer system.

9. The method according to claim 1, wherein the step of sending authorizes the payment transaction against the one of the enabled payment accounts according to the priority order.

10. The method according to claim 1, wherein the step of causing includes de-linking the RFID sticker from the each payment device.

11. The method according to claim 10, wherein the de-linking of the RFID sticker from the each payment device includes de-referencing the RFID sticker identifier from the one or more payment accounts associated with the each payment device.

12. The method according to claim 1, wherein the step of performing includes communicating, by the third computer system, with the first computer system.

13. The method according to claim 1, wherein the priority order is predefined according to user preference levels.

14. The method according to claim 1, wherein the priority order is adaptively derived according to user preference levels.

15. The method according to claim 1, wherein balances associated with the payment accounts are transferred from one of the payment accounts to another of the payment accounts.

16. The method according to claim 1, wherein the RFID interrogator serves as a point-of-sale (POS) system.

17. The method according to claim 16 or 4, wherein the POS system includes any of at least one payment computer unit, at least one payment mobile unit, and at least one payment terminal unit.

18. A computer-based system for enabling a payment transaction to be conducted in a linked, integrated, interchangeable payment system (LIIPS) including a passageway payment system using, as a primary payment device, a radio-frequency identification (RFID) sticker secured to a vehicle, the RFID sticker having an antenna and an RFID circuitry coupled to the antenna, the system comprising:
  at least one first computer system maintained in at least one financial institution and arranged to
    link the RFID sticker to a plurality of payment devices by matching and storing in the at least one first computer system an RFID sticker identifier associated with the RFID sticker and a payment device identifier associated with each payment device of the plurality of payment devices,
    reference the RFID sticker identifier to one or more payment accounts held at the at least one first computer system and associated with the each payment device,
    cause the each payment device to be enabled or disabled for use in the payment transaction, and
    arrange the payment accounts to be enabled for use in the payment transaction in a priority order if there are two or more of the payment accounts; and
  a second computer system maintained in the passageway payment system, having an RFID interrogator, and arranged to
    interrogate the RFID circuitry through the antenna and when the vehicle moves into the periphery of the RFID interrogator, acquire the RFID sticker identifier through the interrogated RFID circuitry, and
    extract from the acquired RFID sticker identifier payment account information associated with one of the enabled payment accounts according to the priority order and associated with one of the enabled payment devices.

19. The system according to claim 18, wherein the one of the enabled payment devices is arranged to send the payment account information to a third computer system maintained in a payment processing network.

20. The system according to claim 19, the third computer system performs clearing and settlement operations using the payment account information from the one of the enabled payment devices.

21. The system according to claim 18, wherein the second computer system is further arranged to send the extracted payment account information to a third computer system maintained in a payment processing network.

22. The method according to claim 21, wherein the third computer system performs clearing and settlement operations using the extracted payment account information from the second computer system.

23. The system according to claim 18, wherein the each payment device is selected from the group comprising a magnetic stripe card, a chip card, an embedded integrated circuit, an RFID-enabled card, a data communication device, a secure element in operative communication with the data communication device, a personal computer, and a point-of-sale device.

24. The system according to claim 18, wherein the payment accounts are selected from the group comprising a direct deposit account, a savings account, a debit account, a credit account, a checking account, a cash account, a prepaid account, a money market account, and a loyalty account.

25. The system according to claim 18, wherein the RFID sticker secured to the vehicle is detachably attached to the vehicle.

26. The system according to claim 18, wherein the RFID sticker acts as one of the payment devices being the primary payment device.

27. The system according to claim 18, wherein the RFID sticker is linked to a further RFID sticker acting as one of the payment devices.

28. The system according to claim 18, wherein the RFID sticker comprises hardware and software application programs which characterize a digital ledger system for capturing and storing records associated with the payment transaction.

29. The system according to claim 18, wherein balances associated with the payment accounts are transferred from one of the payment accounts to another of the payment accounts.

30. The system according to claim 18, wherein the one of the enabled payment devices is arranged to record details associated with the payment transaction.

31. The system according to claim 18, wherein the RFID interrogator serves as a point-of-sale (POS) system.

32. The system according to claim 19, wherein the payment devices are engaged in a point-of-sale (POS) transaction at a POS system.

33. The system according to claim 32, wherein the payment devices, the POS system, and the payment processing network communicate with one another in a central processing server computer over a data communication network.

34. The system according to claim 33, wherein the central processing server computer is connected to a traffic assistance platform.

35. The system according to claim 31 or 32, wherein the POS system includes any of at least one payment computer unit, at least one payment mobile unit, and at least one payment terminal unit.

* * * * *